(12) United States Patent
Zhou

(10) Patent No.: US 8,692,953 B2
(45) Date of Patent: Apr. 8, 2014

(54) FIXED STRUCTURE FOR LED STRIP AND LCD

(75) Inventor: Gege Zhou, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 223 days.

(21) Appl. No.: 13/145,464

(22) PCT Filed: Jun. 1, 2011

(86) PCT No.: PCT/CN2011/075087
§ 371 (c)(1),
(2), (4) Date: Jul. 20, 2011

(87) PCT Pub. No.: WO2012/129839
PCT Pub. Date: Oct. 4, 2012

(65) Prior Publication Data
US 2012/0307175 A1   Dec. 6, 2012

(30) Foreign Application Priority Data

Mar. 25, 2011 (CN) .......................... 2011 2 0083410

(51) Int. Cl.
*G02F 1/1335* (2006.01)
(52) U.S. Cl.
USPC .............................................. 349/58; 349/60

(58) Field of Classification Search
USPC ...................................................... 349/58, 60
See application file for complete search history.

(56) References Cited

U.S. PATENT DOCUMENTS

| 8,167,476 B2 * | 5/2012 | Sakamoto et al. ............ 362/612 |
| 2008/0024694 A1 * | 1/2008 | Kondo et al. .................. 349/58 |

\* cited by examiner

*Primary Examiner* — Phu Vu

(57) ABSTRACT

This invention relates to an LED strip fixed structure and an LCD, wherein the LED strip fixed structure includes a back panel, an LED strip and a strip fixed element, a groove used for accommodating the LED strip is formed on the strip fixed element, and light holes used for accommodating LEDs on the LED strip are formed in the groove; the fixed element is used for containing the LED strip, and is fixedly connected with the back panel. In this invention, the fixed element for accommodating the LED strip is fixed on the side wall of the back panel, so as to increase the heat dissipation channel of the LED strip; instead of arranging heat dissipation aluminum extrusion between the LED strip and the back panel, and so as to reduce the quantity of connecting pieces such as connecting screws. This invention improves the effect of heat dissipation at the backlight part of the LCD, and meanwhile simplifies the installation structure of the LED strip and lowers the cost.

12 Claims, 4 Drawing Sheets

FIXED STRUCTURE FOR LED STRIP AND LCD

BENEFIT CLAIMS

This application is a US National Stage of International Application No. PCT/CN2011/075087, filed Jun. 1, 2011, which claims the benefit of CN201120083410.9 filed Mar. 25, 2011.

FIELD OF THE INVENTION

This invention relates to the technical field of (liquid crystal display) LCDs, in particular to a fixed structure for an LED (Light Emitting Diode) strip and an LCD.

BACKGROUND OF THE INVENTION

An LCD is a panel display device for displaying the image by utilizing the liquid crystal, has the advantages of lightness and thinness, lower driving voltage and lower power consumption compared with other display devices, and therefore is widely applied in the whole industry. Whereas, an LCD panel of the LCD can not automatically emit light, and a backlight source assembly providing artificial light independently is needed.

An LED lamp serves as the backlight source, and the backlight source adopts two types: a side backlight and a bottom backlight, and compared with a cold cathode fluorescent lamp (CCFL), the LED lamp has the advantages of energy conservation, long service life and small size, and is regarded as the development tendency of the LCD in future.

In the existing LED lamp backlight device of the LCD, an LED strip is mounted on a back panel, and an aluminum extrusion is arranged between the LED lamp and the back panel. When in use of the LED lamp backlight device, the heat emitted from the LED is diffused to the direction of the aluminum extrusion to the back panel, however, this heat dissipation method can not effectively diffuse the heat emitted from the LED to its side, thereby leading to the obvious temperature rise at the part of an LCD panel near the LED lamp. The temperature rise not only reduces the luminous efficiency of the LED lamp, but also causes uneven temperature of an LCD board which is provided with the backlight by the LED lamp, and the LCD board presents reddish phenomenon at the part near the LED lamp due to the extreme temperature, thereby influencing the image quality of the LCD. What's more, the temperature rise of the LED lamp greatly shortens the service life. However, the installation structure of the existing LED lamp can not meet requirements for heat dissipation of the LED lamp backlight device.

SUMMARY OF THE INVENTION

The main object of this invention is to provide an LED strip fixed structure and an LCD. The purpose is to improve the effect of heat dissipation at the backlight part of the LED lamp of the LCD.

In order to reach the purpose, this invention provides an LED strip fixed structure, which includes a back panel and LED strips, and the fixed structure also includes strip fixed elements, wherein and a groove for accommodating the LED strip is formed on the fixed element; light holes used for accommodating LEDs on the LED strip are formed in the groove; the fixed element is used for containing the LED strip, and is fixedly connected with the back panel; the back panel includes a bottom panel and side walls, a first fixed plate is arranged on the top of the side wall of the back panel, and buckles clamped in the first fixed plate are arranged on the top of the fixed element.

Preferably, buckling holes are formed along the side wall on the bottom panel of the back panel, and cards which can be inserted to the buckling holes are arranged on the bottom of the fixed element.

Preferably, the back side of the LED strip is contacted with the side wall of the back panel.

Preferably, first screw holes are formed on the side wall of the back panel, second screw holes are formed in the position of the fixed element corresponding to the first screw holes, and the first screw hole and the second screw hole are connected through a screw, thereby fixing the fixed element on the back panel.

Preferably, the first screw holes are formed at the two ends of the side wall of the back panel; the second screw holes are formed at the two ends of the fixed element.

Preferably, buckling holes are formed along the side wall on the bottom panel of the back panel, and cards which can be inserted to the buckling holes are arranged at the bottom of the fixed element.

This invention also provides an LED strip fixed structure, which includes a back panel and LED strips, and the fixed structure also includes strip fixed elements, wherein and a groove for accommodating the LED strip is formed on the fixed element; light holes used for accommodating LEDs on the LED strip are formed in the groove; the fixed element is used for containing the LED strip, and is fixedly connected with the back panel.

Preferably, the back panel includes a bottom panel and side walls, wherein first screw holes are formed on the side wall of the back panel, second screw holes are formed in the position of the fixed element corresponding to the first screw holes, and the first screw hole and the second screw hole are connected through a screw, thereby fixing the fixed element on the back panel.

Preferably, the first screw holes are formed at the two ends of the side wall of the back panel; the second screw holes are formed at the two ends of the fixed element.

Preferably, first fixed plates are arranged on the top of the side wall of the back panel, and second fixed plates are arranged on the top of the fixed element; the first fixed plate and the second fixed plate are fixedly connected through a connecting piece.

Preferably, the connecting piece is a rivet bolt fixed on the first fixed plate, and a location hole penetrating and sleeving the rivet bolt is formed on the second fixed plate Preferably, the location hole includes a large hole and a small hole communicated with the large hole.

Preferably, buckling holes are formed along the side wall on the bottom panel of the back panel, and cards which can be inserted to the buckling holes are arranged on the bottom of the fixed element.

Preferably, the back side of the LED strip is contacted with the side wall of the back panel.

This invention also provides a LCD, including a back panel, LED strips and strip fixed elements. A groove is formed in the fixed element and the LED strip is accommodated in the groove; light holes used for accommodating the LED on the LED strips are formed in the groove; the fixed element accommodates the LED strip and is fixedly connected with the back panel.

Preferably, the back panel includes a bottom panel and a side wall. First screw holes are arranged on the side wall of the back panel. Second screw holes are arranged in the position of the fixed element corresponding to the first screw holes and the first screw hole connects with the second screw hole through a screw and then fixes the fixed element to the back panel.

Preferably, first fixed plates are arranged on the top of the side wall of the back panel. Second fixed plates are arranged on the top of the fixed elements; the first fixed plate fixedly connects with the second fixed plate through a connecting piece.

Preferably, the connecting piece is a rivet bolt fixed in the first fixed plate. A location hole is arranged on the second fixed plate to penetrate and sleeve the rivet bolt.

Preferably, first fixed plates are arranged on the top of the side wall of the back panel. Buckles clamped in the first fixed plate are arranged on the top of the fixed elements.

Preferably, buckle holes are arranged on the bottom panel of the back panel along the side wall. Cards which can be inserted into the buckle holes are arranged on the bottom of the fixed elements.

This invention provides a LED strip fixed structure and an LED. The fixed element for accommodating the LED strip is fixed on the side wall of the back panel, so as to increase the heat dissipation channel of the LED strip at the backlight part and reduce the quantity of connecting pieces such as connecting screws. This invention improves the effect of heat dissipation at the backlight part of the LCD, and meanwhile simplifies the installation structure of the LED strip and lowers the cost.

DESCRIPTION OF ATTACHED DRAWINGS

The realization of the purpose, functional features and advantages of this invention can be further described with reference to the attached drawings.

DETAILED DESCRIPTION OF THE EMBODIMENTS

The overall thinking of the technical scheme in this invention is to increase the heat dissipation channel at the backlight part of the LED strip of the LCD and improve the effect of heat dissipation by installing the LED strip to the fixed element and then fixing the fixed element on the back panel of the LCD.

The followings are detailed descriptions of the technical plan to realize the purpose of this invention by combination of the attached drawings and embodiments. It should be understood that the specific embodiments described here are only used to explain this invention but not limited this invention.

Figure 1:
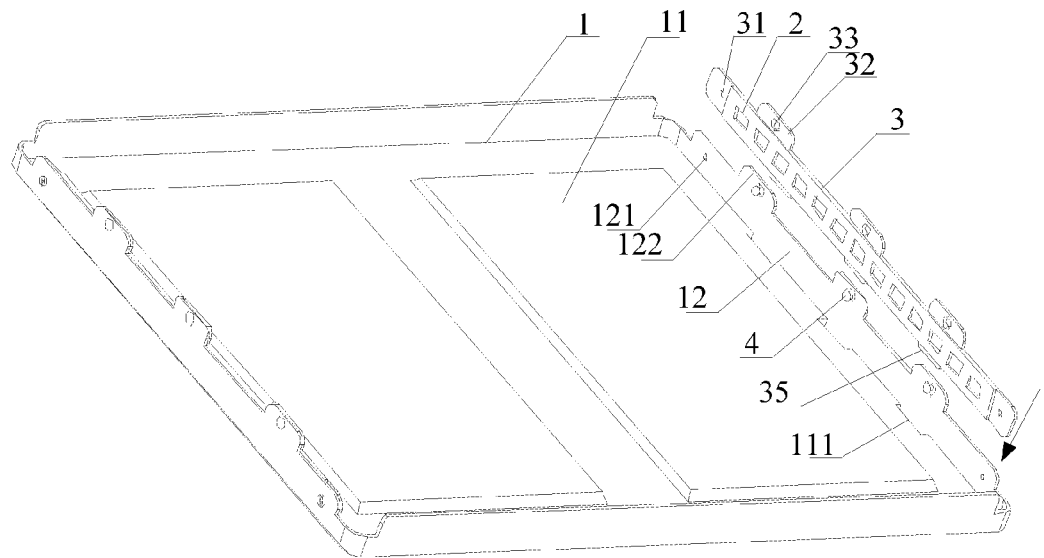
FIG. 1 is the installation diagram in the first embodiment of the LED strip fixed structure in this invention.
Figure 2:
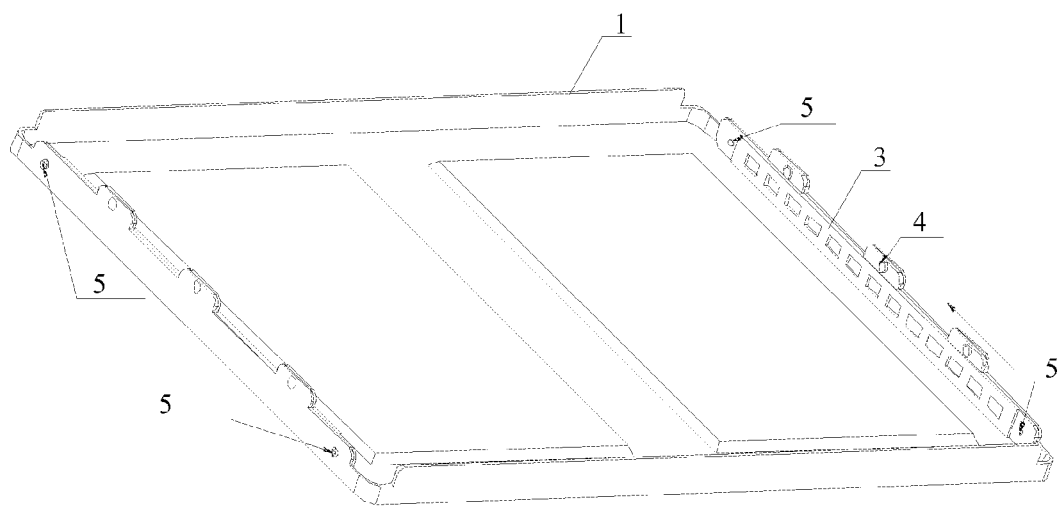
FIG. 2 is the structure diagram after installing the back panel and the fixed elements which is shown in FIG. 1.
Figure 4:
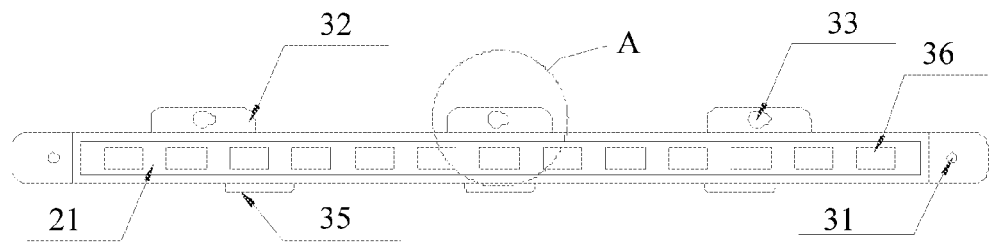
FIG. 4 is the structure diagram of the fixed elements in the first embodiment of the LED strips fixed structure in this invention.

Please refer to FIG. 1, FIG. 2 and FIG. 4. FIG. 1 is the installation drawing in the first embodiment of the LED strip fixed structure in this invention. FIG. 2 is the structure diagram after installing the back panel 1 and the fixed element 3 shown in FIG. 1. FIG. 4 is the structure diagram of the fixed element 3 in the first embodiment. The LED strip fixed structure in the first embodiment in this invention includes the back panel 1, the LED strip 2 and the strip fixed element 3. The back panel 1 includes the back panel 11 and the side wall 12, the LED strip 2 is arranged on the side wall 12 of the back panel 1 and is fixed to the side wall 12 of the back panel 1 with the fixed element 3. A groove 21 is formed in the fixed element 3. Light holes 36 are formed in the groove 21. The LED strip 2 is accommodated in the groove 21 in the strip fixed element 3 and the LED on the LED strip 2 is accommodated in the light hole 36; the fixed element 3 is fixedly connected with the side wall 12 of the back panel 1 and the back surface of the LED strip 2 touches the side wall 12 of the back panel 1. The fixed element 3 in the embodiment adopts the heat dissipation materials.

As shown in FIG. 2 for the structure after installing the back panel 1 and the fixed element 3, the fixed element 3 is fixedly connected to the back panel 1 with a screw 5. A first screw hole 121 is arranged on the side wall 12 of the back panel 1. A second screw hole 31 is arranged in the position in the fixed element 3 corresponding to the first screw hole 121. The first screw hole 121 and the second screw hole 31 are connected with the screw 5 and then the fixed element 3 is fixed to the back panel 1.

Wherein, the first screw hole 121 can be arranged in two ends of the side wall 12 of the back panel 1; corresponding, the second screw hole 31 can be arranged in two ends of the fixed element 3. In this invention, the above two screw holes 121 and 31 are not limited to the above positions. They can also be arranged respectively on other positions of the side wall 12 of the back panel 1 and the fixed element 3.

In addition, a first fixed plate 122 is arranged on the side wall 12 of the back panel 1 and a second fixed plate 32 is arranged in the top of the fixed element 3; the first fixed plate 122 is fixedly connected to the second fixed plate 32 with a connecting piece. This connecting method such as fixed plate can preferably fix the fixed element 3 accommodating the LED strip 2 to the back panel 1.

Figure 3:
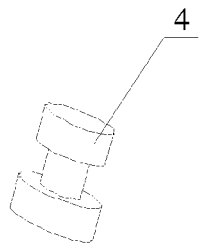
FIG. 3 is the enlarged diagram of the rivet bolt in the first embodiment of the LED strip fixed structure in this invention.
Figure 5:
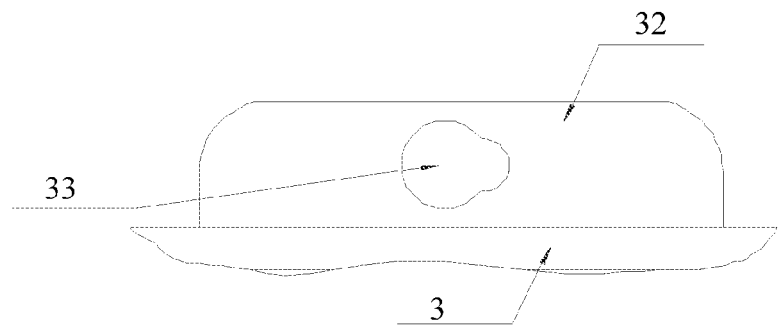
FIG. 5 is the enlarged diagram for Position A which is shown as FIG. 4.

Wherein, the connecting piece can be a rivet bolt 4 which is fixed to the first fixed plate 122, as shown in FIG. 3, which is the enlarged diagram of the rivet bolt. Meanwhile, a location hole 33 is arranged on the second plate 32 to penetrate and sleeve the rivet bolt, as shown in FIG. 4, which is the structure diagram of the fixed element 3 in the first embodiment of the LED strip fixed structure in this invention. FIG. 5 is the enlarged diagram for Position A in FIG. 4. The location hole 33 includes a large hole (not shown in the figure) and a small hole (not shown in the figure) connecting with the large hole, the shape of which can be a gourd or others including the large hole and the small hole. In addition, a buckle hole 111 is arranged on the bottom panel 11 of the back panel 1 along the side wall 12. A card 35 can be arranged on the bottom of the fixed element 3 to insert the buckle hole 111, so as to preferably fix the fixed element 3 to the back panel 1.

When installing, first put the LED strip 2 into the groove 21 of the fixed element 3 accommodating the LED strip 2, then insert the fixed element 3 accommodating the LED strip 2 into the back panel 1 in the arrow direction shown in FIG. 1 so that the back surface of the LED strip 2 can touch the side wall 12 of the back panel 1; the card 35 in the bottom of the fixed element 3 is clamped into the buckle hole 111 on the bottom panel 11 of the back panel 1 and the lower part of the fixed element 3 is fixed with the back panel 1. Meanwhile, penetrate and sleeve the large hole of the gourd-shaped hole 33 on the second fixed plate 32 on the fixed element 3 to the rivet bolt 4 which is riveted to the back panel 1, then push the fixed element 3 to the scheduled position in the arrow direction shown in FIG. 2 so that the rivet bolt 4 which is riveted on the back panel 1 fixes the upper part of the fixed element 3 and the back panel 1 through the small hole of the location hole 33 on the fixed element 3, and finally lock a screw 5 tightly on two ends of the fixed element 3. Then, the fixed element 3 can be completely fixed with the back panel 1.

Compared with the condition that installing the LED strip 2 to the back panel 1 and arranging an aluminum extrusion between the LED strip 2 and the back panel 1 in the prior art, since in the embodiment the LED strip 2 is fixed to the back panel 1 with the fixed element 3, which adopts the heat dissipation materials and accommodates the LED on the LED strip 2 in the light hole 36 of the groove 21 on the fixed element 3, the heat produced by the LED strip 2 can dissipate through the back surface of the LED strip 2 and respective side wall of the groove 21, so as to increase the dissipation path of the LED strip 2 and improve the dissipation effect of the LED strip 2. Meanwhile, it is not necessary to add the aluminum extrusion used for dissipating heat between the LED strip 2 and the back panel 1 so as to lower the cost.

Therefore, the embodiment can preferably and faster fix the LED strip 2 with the fixed element 3 and increase the dissipation effect on the backlight part of the LCD.

Figure 6:
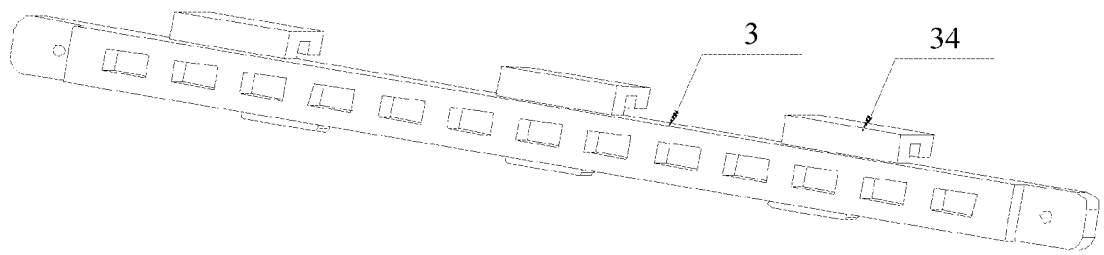
FIG. 6 is the structure diagram of the fixed elements in the second embodiment of the LED strips fixed structure in this invention.

Please refer to FIG. 6 which is the structure diagram of the fixed element in the second embodiment of the LED strip fixed structure in this invention; similar to the first embodiment as above, the different features of the LED strip fixed structure in the second embodiment in this invention is in that: a buckle 34 is arranged on the top of the fixed element 3 instead of the second fixed plate 32 in the first embodiment. The buckle 34 is connected with the first fixed plate 122 on the side wall 12 of the back panel 1 as shown in FIG. 1.

When installing, similar to the first embodiment as above, however in the second embodiment, insert the fixed element 3 into the back panel 1 in the arrow direction as shown in FIG. 1 and then immediately lock a screw 5 instead of pushing the fixed element 3 in the arrow direction as shown in FIG. 2.

Figure 7:
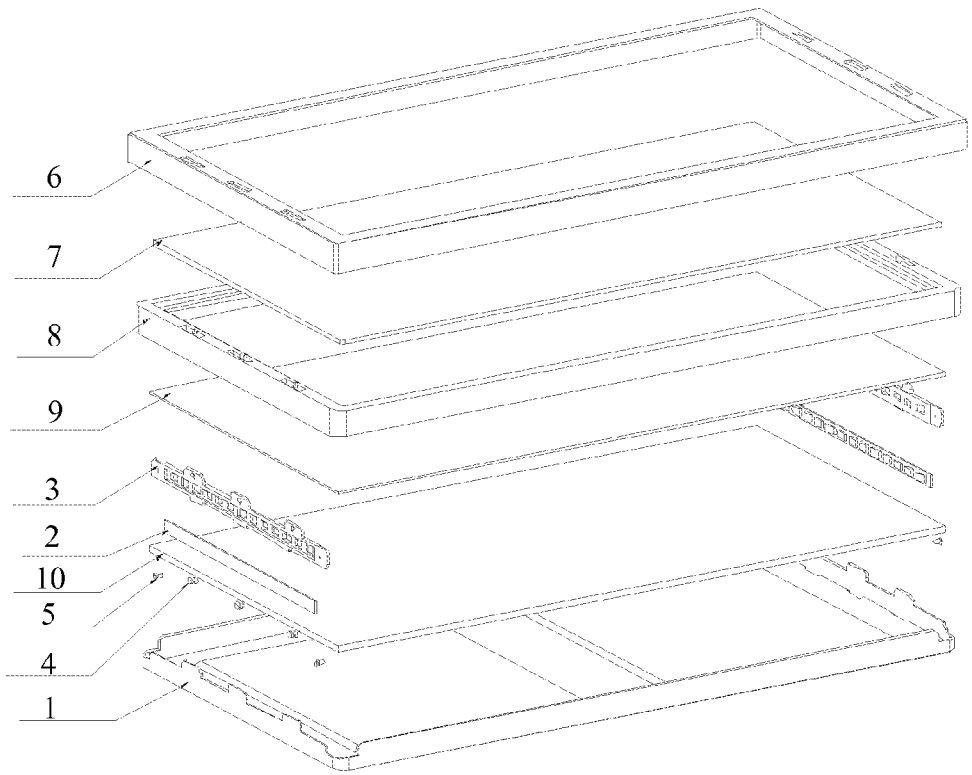
FIG. 7 is the structural decomposition diagram of an embodiment of the LCD in this invention.
Figure 8:
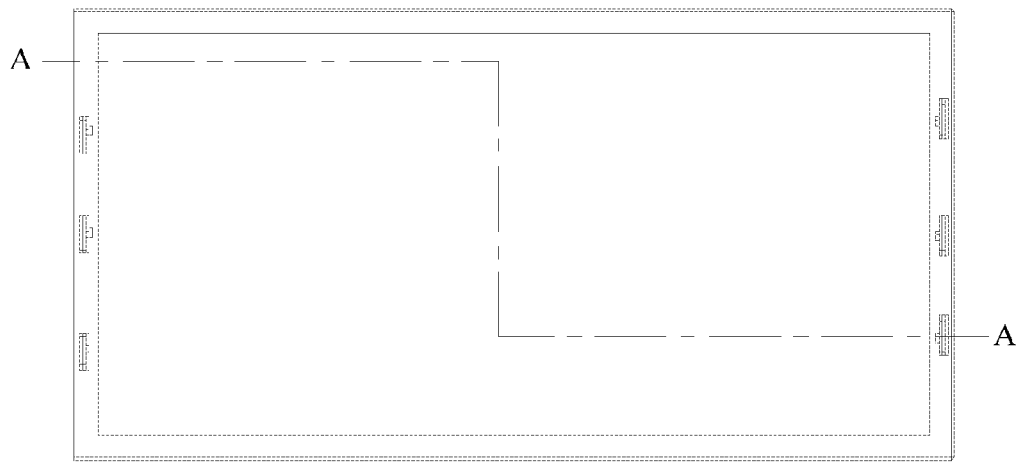
FIG. 8 is the front view of an embodiment of the LCD in this invention.
Figure 9:
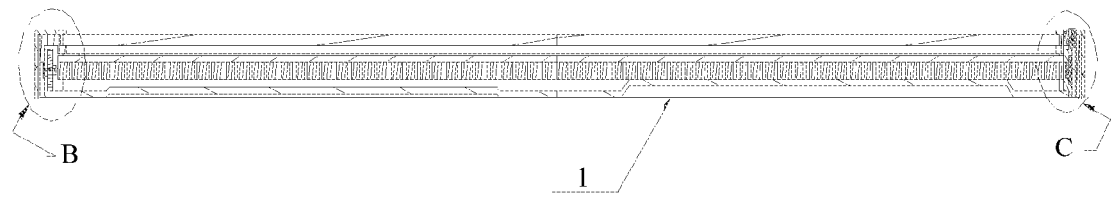
FIG. 9 is the section view in direction A-A which is shown in FIG. 8.
Figure 10:
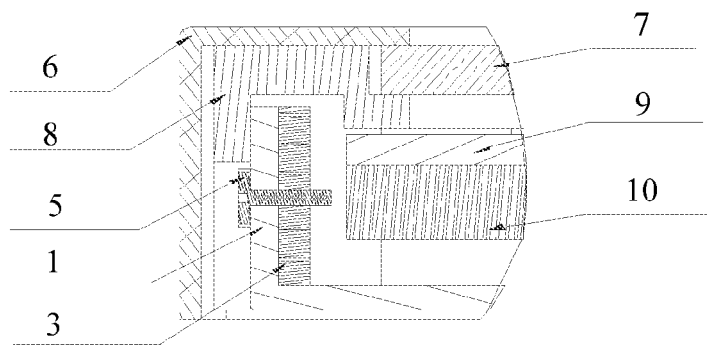
FIG. 10 is the enlarged diagram for Position B which is shown in FIG. 9.
Figure 11:
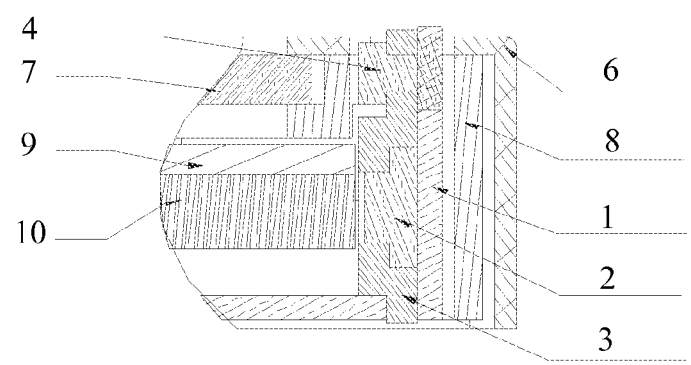
FIG. 11 is the enlarged diagram for Position C which is shown in FIG. 9.

Please refer to FIG. 7, FIG. 8, FIG. 9, FIG. 10 and FIG. 11 altogether. FIG. 7 is the structure decomposition diagram of an embodiment of an LCD in this invention. The LCD of the embodiment in this invention includes a back panel 1, a LED strip 2, a fixed element 3, a front frame 6, a panel 7, a rubber frame 8, an optical film 9 and an LGP 10. A groove is arranged on the fixed element 3. The LED strip 2 is accommodated in the groove on the fixed element 3; the fixed element 3 is fixedly connected with the back panel 1 with a rivet bolt 4 and a screw 5. FIG. 8 is the front view diagram of an embodiment of the LCD in this invention; FIG. 9 is the cross section diagram in the A-A direction as shown in FIG. 8; FIG. 10 is the enlarged diagram for Position B as shown in FIG. 9; FIG. 11 is the enlarged diagram for Position C as shown in FIG. 9.

The fixedly connected method between the fixed element 3 and the back panel 1 in the embodiment can adopt the methods in the first embodiment and the second embodiment as above. Here, we will not describe in details.

When installing, first fix the fixed element 3 accommodating the LED strip on the two side walls of the back panel 1, then successively place the (light guide plate) LGP 10 and the optical film 9 on the bottom panel on the back panel 1. Then fix the rubber frame 8 to the back panel 1, place the panel 7 on the rubber frame 8 and finally install the front frame 6 to fix the panel 7 and the rubber frame 8 with the front frame 6.

The embodiments mentioned as above are only the preferential embodiments of this invention, and can not limit the patent scope. The equivalent structure or flow change formed by using the description of this invention and contents of attached drawings, or direct or indirect application to other relevant technical fields, are all included in the extent of patent protection scope of this invention.

What is claimed is:

1. A fixed structure for an LED strip comprising a back panel and the LED strip, characterized in that, the fixed structure also comprises a strip fixed element, and a groove for accommodating the LED strip is formed thereon; light holes used for accommodating LEDs on the LED strip are formed in the groove; the fixed element is used for containing the LED strip, and is fixedly connected with the back panel; the back panel includes a bottom panel and side walls, first fixed plates are arranged on the top of the side wall of the back panel, and buckles clamped in the first fixed plates are arranged on the top of the fixed element; and buckling holes are formed along the side wall on the bottom panel of the back panel, cards which can be inserted to the buckling holes are arranged at the bottom of the fixed element.

2. The fixed structure for the LED strip as claimed in claim 1, wherein the back side of the LED strip is contacted with the side wall of the back panel.

3. The fixed structure for the LED strip as claimed in claim 2, wherein first screw holes are formed on the side wall of the back panel, second screw holes are formed in the position of the fixed element corresponding to the first screw holes, and the first screw hole and the second screw hole are connected through a screw, thereby fixing the fixed element on the back panel.

4. The fixed structure for the LED strip as claimed in claim 3, wherein the first screw holes are formed at the two ends of the side wall of the back panel; the second screw holes are formed at the two ends of the fixed element.

5. The fixed structure for the LED strip as claimed in claim 4, wherein buckling holes are formed along the side wall on the bottom panel of the back panel, cards which can be inserted to the buckling holes are arranged at the bottom of the fixed element.

6. A fixed structure for an LED strip comprising a back panel and an LED strip, characterized in that, the fixed structure also comprises a strip fixed element, and a groove for accommodating the LED strip is formed thereon; light holes used for accommodating LEDs on the LED strip are formed in the groove; the fixed element is used for containing the LED strip, and is fixedly connected with the back panel; the back panel comprises a bottom panel and side walls, first screw holes are formed on the side wall of the back panel, second screw holes are formed in the position of the fixed element corresponding to the first screw holes, and the first screw hole and the second screw hole are connected through a screw, thereby fixing the fixed element on the back panel.

7. The fixed structure for the LED strip as claimed in claim 6, wherein first screw holes are formed at the two ends of the side wall of the back panel; second screw holes are formed at the two ends of the fixed element.

8. The fixed structure for the LED strip as claimed in claim 6, wherein buckling holes are formed along the side wall on the bottom panel of the back panel, cards which can be inserted to the buckling holes are arranged on the bottom of the fixed element.

9. The fixed structure for the LED strip as claimed in claim 6, wherein the back side of the LED strip is contacted with the side wall of the back panel.

10. An LCD comprising a back panel and an LED strip, characterized in that, the LCD also comprises a strip fixed element, a groove is formed on the fixed element, and the LED strip is accommodated in the groove; light holes used for accommodating LEDs on the LED strip are formed in the groove; the fixed element is used for containing the LED strip, and is fixedly connected with the back panel; the back panel comprises a bottom panel and side walls, first screw holes are formed on the side wall of the back panel, second screw holes are formed in the position of the fixed element corresponding to the first screw holes and the first screw hole and the second screw hole are connected through a screw, thereby fixing the fixed element on the back panel.

11. The LCD as claimed in claim 10, wherein first fixed plates are arranged on the top of the side wall of the back panel, and buckles clamped in the first fixed plates are arranged on the top of the fixed element.

12. The LCD as claimed in claim 11, wherein buckling holes are formed along the side wall on the bottom panel of the back panel, and cards which can be inserted to the buckling holes are arranged at the bottom of the fixed element.

* * * * *